United States Patent [19]

Kissell et al.

[11] 4,173,141

[45] Nov. 6, 1979

[54] METHOD OF DETERMINING GAS LEAKAGE THROUGH A MINE STOPPING

[75] Inventors: Fred N. Kissell, Pittsburgh; Slavoljub D. Maksimovic, Library, both of Pa.; Joseph E. Matta, Bel Air, Md.

[73] Assignee: The United States of America as represented by the Secretary of the Interior, Washington, D.C.

[21] Appl. No.: 964,416

[22] Filed: Nov. 28, 1978

[51] Int. Cl.² ............................................. G01M 3/20
[52] U.S. Cl. .................................................... 73/40.7
[58] Field of Search ...................... 73/40.7, 40.5 R, 40

[56] References Cited

U.S. PATENT DOCUMENTS 4,055,074  10/1977  Thimons et al. ......................... 73/40

Primary Examiner—Gerald Goldberg
Assistant Examiner—Joseph W. Roskos
Attorney, Agent, or Firm—Thomas Zack; Donald A. Gardiner

[57] ABSTRACT

A method of determining the gas leakage through a mine stopping. The mine stopping, whose leakage is to be measured, is set up in a mine. Next, a test barrier is set up in the mine adjacent to the stopping. The volume between these two structures forms a closed test chamber filled with ambient gas. A known trace gas different from the ambient gas or a known contaminating gas is introduced into the chamber and mixed therein. Thereafter, periodic measurements are made of the rate of change in concentration of the tracer gas. Lastly, based upon the measured rate of change in concentration of the tracer gas, the leakage past the mine stopping is determined.

5 Claims, 2 Drawing Figures

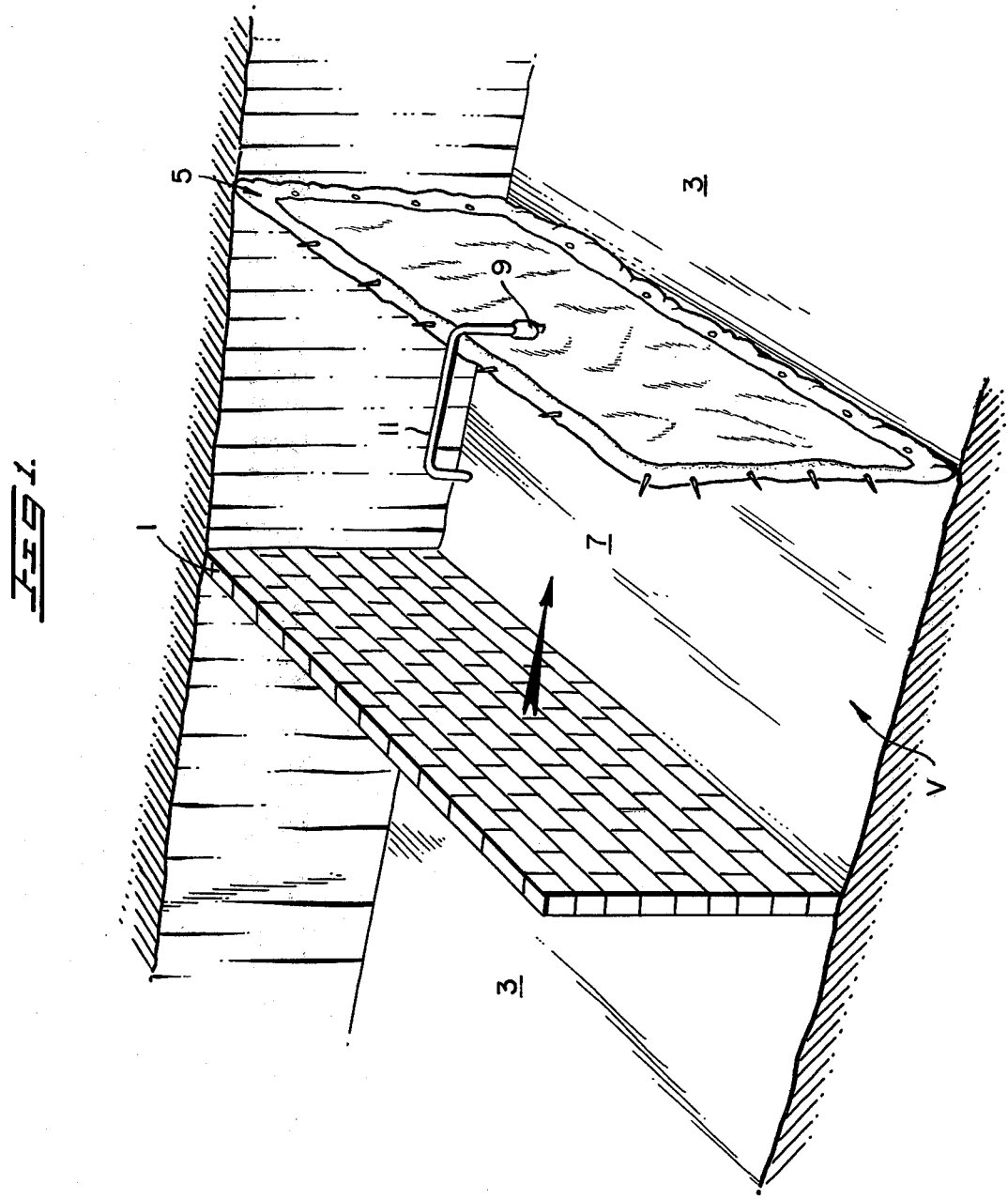

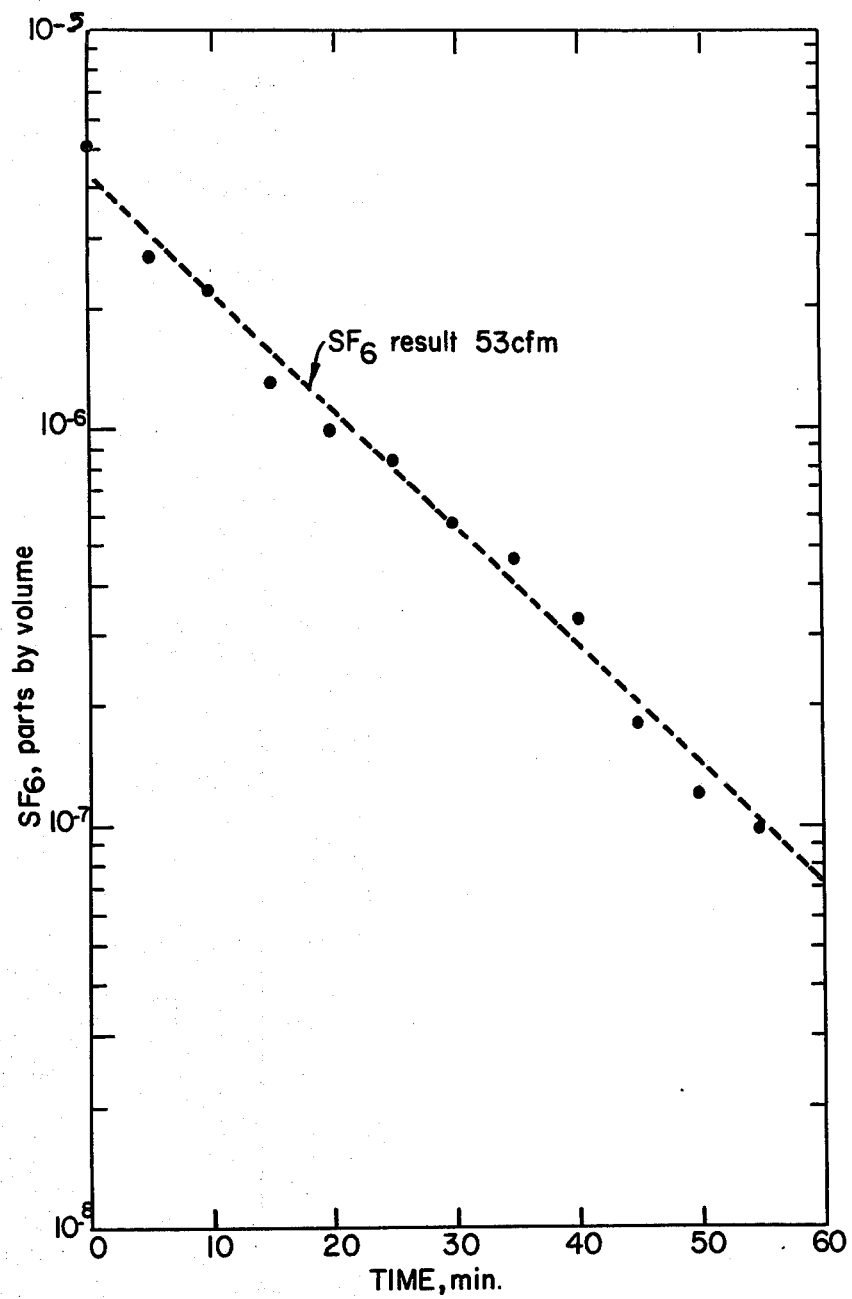

METHOD OF DETERMINING GAS LEAKAGE THROUGH A MINE STOPPING

BACKGROUND OF THE INVENTION

1. Field of the Invention

This invention is in the area of measuring gas leakage past a barrier.

2. Description of the Prior Art

Gas leakage around or through a mine barrier has previously been determined. The U.S. Pat. No. 4,055,074 (Thimons et al) represents the closest known prior art concerned with the mining field. However, this prior art invention does not employ a tracer gas and as a result would not include most of the essential elements and steps herein claimed. The Thimons et al patent does teach the broad concept of setting up a test barrier near the mine stopping or barrier whose leakage is to be measured and then making measurements with an anemometer at various windows at the test barrier. These measurements may be at a single window or a combination of windows. Using the measurements and the principles of fluid dynamics, the total leakage past the permanent mine stopping is mathematically determined.

In contrast to the method disclosed in the Thimons et al patent, we employ a method for measuring leakage which utilizes a tracer gas and is as a result more accurate and capable of measuring much lower leaks. This is because direct measurement of air velocity is not necessary in a tracer gas method.

The prior art also teaches the concept of injecting a tracer gas into a vessel to determine the gas leakage therefrom. The three U.S. Pat. Nos. 3,425,264 (Frei), 3,487,677 (Molitor), and 3,721,117 (Ford) disclose this method. None are concerned with the mining field nor with the measurement of gas leakage past a mine stopping as set forth in our claims.

SUMMARY OF THE INVENTION

Our invention is a method of determining the gas leakage past a mine stopping. Initially, a test barrier is set up in the mine adjacent to the stopping to form in the space therebetween and the interposed mine walls a closed test gas chamber. Next, a tracer gas capable of being differentiated in the test chamber is introduced into the chamber. All gases within the chamber are mixed to insure a generally uniform concentration of each there throughout. Thereafter, the rate of change in the concentration of the tracer gas is periodically measured. And based upon the measured change in concentration, the leakage of gas past the mine stopping is determined.

The primary object of this invention is an improved method of determining the leakage past a mine stopping.

BRIEF DESCRIPTION OF THE DRAWING

FIG. 1 illustrate a typical mine installation set up used to practice our invention.

FIG. 2 graphically depicts different time measurements of the concentrations for the tracer gas sulfur hexafluoride.

DESCRIPTION OF THE PREFERRED EMBODIMENT

Referring to FIG. 1 there is shown a more or less typical mine air stopping 1 in situ within a mine. Essentially the purpose of our invention is to measure the air leakage that flows through this stopping. Although the particular stopping illustrated is made up of a concrete block wall extending from the floor to roof and wall to wall of the mine entry, other types can also be used. The stopping could be a brattice curtain sealed at the edges to the walls, floor, and roof of the mine. The exact details of the structure of the stopping are irrelevant to this invention as long as it functions to provide an air seal within the mine.

The United States Bureau of Mines Report of Investigations (RI) entitled "Tracer Gas Method for Measuring Leakage through Mine Stoppings" authored by us and first published in RI 8324 describes details and experiments relating to this invention. The contents of the RI are specifically incorporated by reference herein.

Pertaining to FIG. 1 there is shown the mentioned stopping 1 built in the mine passageway 3. The first step in the preferred embodiment of our method is to setting up a temporary brattice cloth curtain or test barrier 5 spaced about 10 feet from the permanent stopping 1. The volume V of space 7 formed between these two barriers (1 and 5) and the enclosed walls, floor, and roof forms a generally closed gas test chamber. After set up, the next step is to introduce a tracer gas into the space 7. As indicated in the referenced RI, extensive tests have been conducted using the tracer gas sulfur hexafluoride ($SF_6$) and the naturally occuring tracer gas methane ($CH_4$).

After the tracer gas has been introduced into the test chamber, the gases in the chamber are mixed to insure a uniform distribution throughout the volume V. Mixing may be accomplished by a person going into the chamber and moving a flat board therein for several minutes. After the person completes the mixing step he or she leaves the chamber through the barrier 5 and then carefully checks the same barrier for any observable gas leaks.

The next step following the mixing step is to collect gas samples from the chamber at the same fixed time intervals. Using the hand pump 9 connected to the chamber via the hollow tubing 11, the gas samples are collected. The opened end of the tube is hung at the center of chamber and the other end is placed outside of the chamber for sampling. The concentration of the tracer gas is measured, with an instrument such as an electron-capture chromatograph, from the samples and plotted versus time on semi-log paper as shown in FIG. 2. An example of the type of chromatograph which may be used is the Model 215 AWP manufactured by Systems, Science, and Software Company of La Jolla, Calif. It, of course, is possible to measure the tracer gas concentrations directly instead of taking gas samples.

The last basic step of our invention is to determine the amount of gas leakage $Q_L$ past the stopping 1 based upon the measured concentrations C taken at the different time intervals. The change in the tracer gas concentration in the fixed volume V between the two barriers as a function of time t is:

$$VdC = Q_L C_L dt - Q_L C dt \qquad (1)$$

where: $C_L$ is the instant tracer gas concentration in the gas leaking through the stopping 1, $Q_L$ the gas leakage through the stopping, and C the instant tracer gas concentration at any given time within the testing chamber volume V. The gas leakage $Q_L$ from the stopping is assumed to mix well. For a constant value of $Q_L$ and $C_L$:

$$C = C_L - (C_L - C_o)e^{-QL(t)/V} \quad (2)$$

where $C_o$ is the initial tracer gas concentration within the volume V from the time of the first periodic measurement.

If the measured concentration of the tracer gas ($C_L$) in the leakage air ($Q_L$) is zero then equation (2) reduces to:

$$C = C_o e^{-QL(t)/V} \quad (3)$$

A semi-log plot of the concentration of the tracer gas versus time would yield a straight line with a slope of $-Q_L/V$. Multiplying the negative of the slope by the volume V one obtains the stopping leakage $Q_L$.

The present method can also be practiced without actually introducing a foreign tracer gas into the ambient air. Suppose there is a contaminating mine gas—like methane—with a constant contaminating gas content greater than that initially measured in the test volume V, then with the test stopping 9 hung on the low pressure side of the leak, the contaminating gas can act like a tracer gas. In this situation $C_L$, $C_o$, and equation (2) is rewritten to:

$$C_L - C = (C_L - C_o)e^{-QL(t)/V} \quad (4)$$

The semi-log plot of $C_L - C$ versus time yields a straight line with a slope of $(-Q/V)L$. By multiplying the negative of the slope by the volume V, the stopping leakage can be obtained.

FIG. 2 shows the results of one such test using the first cited procedure. The SF$_6$ tracer gas was introduced into the fixed volume V and the concentration of the gas measured at 5 minute intervals for the next hour. The concentrations were then plotted as shown in FIG. 2 and a 53 cfm leakage was computed from the slope of the dashed line drawn through the plotted concentration points.

Other variations from the described preferred embodiment are, of course, possible. None should be used to vary the scope and extent of our invention which is to be measured only by the claims which follow.

We claim:

1. A method for determining the gas leakage past a mine passageway stopping comprising the steps of:
    (1) setting up a test gas barrier in the mine passageway adjacent to the mine stopping to form a substantially closed gas test chamber therebetween;
    (2) introducing a tracer gas into the test chamber;
    (3) mixing said tracer gas with the ambient gas in the test chamber;
    (4) periodically measuring the rate of change in concentration of said tracer gas in the chamber; and
    (5) determining the gas leakage past said mine passageway stopping based upon the measured rate of changes in tracer gas concentrations.

2. The method of claim 1 wherein step (1) is performed by hanging a temporary brattice curtain approximately parallel to and less than ten feet from the mine stopping.

3. The method of claim 1 wherein in step (2) the tracer gas introduced into the test chamber is an ambient contaminating gas naturally found in mines.

4. The method of claim 1 wherein step (4) is accomplished by obtaining gas samples at fixed time intervals from the chamber and then using an electron-capture chromatograph on the samples to measure concentration.

5. The method of claim 1 where step (5) is accomplished last and is based in part upon the relationship:

$$C = C_o e^{-QL(t)/V}$$

where C is the measured concentration of the tracer gas at any time, Co the initial tracer gas concentration, $Q_L$ the to be determined gas leakage past the mine stopping, t the time interval beginning from the time Co is measured and ending at the time C is measured, and V the gas volume of the test chamber.

* * * * *